(12) United States Patent
Ippolito et al.

(10) Patent No.: US 6,970,789 B2
(45) Date of Patent: Nov. 29, 2005

(54) METHOD OF DETERMINING A BEST INITIAL FOCAL POSITION ESTIMATE

(75) Inventors: Kim Ippolito, Pittsburgh, PA (US); Oleg Lapets, Allison Park, PA (US); Michael Sipe, Pittsburgh, PA (US); Randall Shopoff, Pittsburgh, PA (US)

(73) Assignee: Cellomics, Inc., Pittsburgh, PA (US)

( * ) Notice: Subject to any disclaimer, the term of this patent is extended or adjusted under 35 U.S.C. 154(b) by 264 days.

(21) Appl. No.: 10/061,525

(22) Filed: Feb. 1, 2002

(65) Prior Publication Data

US 2002/0172964 A1 Nov. 21, 2002

Related U.S. Application Data

(60) Provisional application No. 60/266,163, filed on Feb. 2, 2001.

(51) Int. Cl.$^7$ .............................. G06T 7/60; G06F 9/30; G02B 7/04; G02B 27/64
(52) U.S. Cl. ........................ 702/21; 382/255; 356/496; 356/609; 359/383
(58) Field of Search ........................... 702/21; 356/496, 356/609, 624; 359/383, 684; 382/255; 396/121; 384/255

(56) References Cited

U.S. PATENT DOCUMENTS

| | | | |
|---|---|---|---|
| 4,751,179 A | 6/1988 | Ledis et al. |
| 5,012,267 A | 4/1991 | Higashihara |
| 5,060,002 A | 10/1991 | Ohnuki et al. |
| 5,061,951 A | 10/1991 | Higashihar et al. |
| 5,189,459 A | 2/1993 | Watanabe et al. |
| 5,355,215 A | 10/1994 | Schroeder et al. |
| 5,488,674 A | 1/1996 | Burt et al. |
| 5,557,097 A | 9/1996 | Ortyn et al. |
| 5,589,351 A | 12/1996 | Harootunian |
| 5,590,165 A | 12/1996 | Gohno et al. |
| 5,604,344 A | 2/1997 | Finarov |
| 5,659,384 A | 8/1997 | Ina |
| 5,663,794 A | 9/1997 | Ishizuka |
| 5,664,236 A | 9/1997 | Utagawa |
| 5,686,308 A | 11/1997 | Li et al. |
| 5,732,292 A | 3/1998 | Yaji |
| 5,786,224 A | 7/1998 | Li et al. |
| 5,790,710 A | 8/1998 | Price et al. |
| 5,843,608 A | 12/1998 | Li et al. |
| 5,856,665 A | 1/1999 | Price et al. |
| 5,857,258 A | 1/1999 | Penzes et al. |
| 5,860,032 A | 1/1999 | Iwane |
| 5,862,417 A | 1/1999 | Oyasawara |
| 5,875,258 A | 2/1999 | Ortyn et al. |
| 5,882,933 A | 3/1999 | Li et al. |
| 5,886,813 A | 3/1999 | Nagasawa |
| 5,925,874 A | 7/1999 | Liegel et al. |
| 5,976,885 A | 11/1999 | Cohenford et al. |
| 5,989,835 A | 11/1999 | Dunlay et al. |
| 5,991,028 A | 11/1999 | Cabib et al. |
| 6,007,996 A | 12/1999 | McNamara et al. |
| 6,028,667 A | 2/2000 | Smith et al. |
| 6,130,745 A | 10/2000 | Manian et al. |
| 6,201,619 B1 | 3/2001 | Neale et al. |
| 6,248,988 B1 | 6/2001 | Krantz |
| 6,259,080 B1 | 7/2001 | Li et al. |

FOREIGN PATENT DOCUMENTS

| | | |
|---|---|---|
| EP | 0 544 306 A1 | 6/1993 |
| EP | 0 769 159 B1 | 4/1997 |
| EP | 1 091 229 A2 | 4/2001 |
| WO | WO 95/25293 | 9/1995 |
| WO | WO 96/01438 | 1/1996 |
| WO | WO 97/18566 | 5/1997 |
| WO | WO 00/39578 | 7/2000 |
| WO | WO 00/46590 | 8/2000 |
| WO | WO 00/75709 | 12/2000 |

OTHER PUBLICATIONS

Giuliano, K. A., Nederlof, M. A., DeBiasio, R., Lanni, F., Waggoner, A. S. and Taylor, D. L. (1990) In *Optical Microscopy for Biology* Herman, B. & Jacobson. K. (eds.) Wiley–Liss, New York, pp 543–557.

Hahn, K. DeBiasio R. and Talyor, D. L. (1992) *Nature* 359, 736–738.

Farkas, D. L., Baxter, G., DeBiasio R. L., Gough, A., Nederlof, M. A., Pane, D., Pane, J., Patek, D. R., Ryan, K. W., and Taylor, D. L. (1993) *Annu. Rev. Physiol.* 55. 785–817.

Giuliano, K. A. and Taylor, D. L. (1995) *Curr. Op. Cell. Biol* 7, 4–12.

Giuliano, K. A. and Post, P. L. (1995) *Annu. Rev. Biophys. Biomol. Struct.* 24, 405–434.

Waggoner, A., Taylor, L., Seadler, A., and Dunlay, T. (1996) *Hum. Pathol.* 27, 494–502.

*Primary Examiner*—Marjorie A. Moran
(74) *Attorney, Agent, or Firm*—McDonnell Boehnen Hulbert & Berghoff LLP (57) ABSTRACT

The invention provides a method for a method for determining a best initial focal position estimate for a current sample location on a substrate comprising multiple sample locations, comprising determining the best initial focal position estimate by using a result from one or more techniques selected from the group consisting of linear regression analysis of focal positions determined for at least two other sample locations on the substrate and quadratic regression analysis of focal positions determined for at least three other sample locations on the substrate.

12 Claims, 13 Drawing Sheets

Plate 1　　　　　Linear Regression

Stage Travel Distance. (Z Axis. Linear Approximation. Raw Data)
z = -7841.7+ -1.043*x + 2.664*y Plate 1　　　　　Quadratic Regression

Stage Travel Distance. (Z Axis. Parabolic Approximation. Raw Data)
z = -7780.407 − 19.907*x − 10.287*y +2.129*x*x − 0.046*x*y + 1.012*y*y

Figure 9 ated Feb. 2, 2001.

METHOD OF DETERMINING A BEST INITIAL FOCAL POSITION ESTIMATE

CROSS REFERENCE

This application claims the benefit of U.S. Provisional Application Ser. No. 60/266,163 filed Feb. 2, 2001.

FIELD OF THE INVENTION

The invention relates to autofocusing methods for microscopy systems.

BACKGROUND

High throughput screens ("HTS") and high content screens ("HCS") are essential techniques for use in drug discovery and related areas. Standard HTS use mixtures of compounds and biological reagents along with some indicator compound loaded into arrays of wells in standard microtiter plates with 96 or 384 wells. The signal measured from each well, either fluorescence emission, optical density, or radioactivity, integrates the signal from all the material in the well giving an overall population average of all the molecules in the well. In contrast to HTS, various HCS have been developed to address the need for more detailed information about the temporal-spatial dynamics of cell constituents and processes. HCS automate the extraction of multicolor fluorescence information derived from specific fluorescence-based reagents incorporated into cells (Giuliano and Taylor (1995), *Curr. Op. Cell Biol.* 7:4; Giuliano et al. (1995) *Ann. Rev. Biophys. Biomol. Struct.* 24:405). Cells are analyzed using an optical system that can measure spatial, as well as temporal dynamics. (Farkas et al. (1993) *Ann. Rev. Physiol.* 55:785; Giuliano et al. (1990) In *Optical Microscopy for Biology*. B. Herman and K. Jacobson (eds.), pp. 543–557. Wiley-Liss, New York; Hahn et al (1992) *Nature* 359:736; Waggoner et al. (1996) *Hum. Pathol.* 27:494). The concept is to treat each cell as an object that has spatial and temporal information on the activities of the labeled constituents.

Image acquisition is one of the key procedures in the feature extraction process utilized in HTS and HCS. In order to automate the analysis of cells spread in space, it is necessary to automate the process of image acquisition from different parts of a slide or different wells or fields within a well of a microtiter plate. Prior autofocus methods involve computation of some image statistic for all different focal planes, and then selection of the focal plane with the highest statistic. This method is costly both in terms of time and in terms of photobleaching the sample and limits the efficiency of HT and HC screening. Furthermore, problems can appear due to irregularities in the slide or microtiter plate such that the position of the plate relative to the objective is different at different locations on the slide or microtiter plate.

Thus, there exists a need in the art for a more rapid autofocusing method to improve the efficiency and throughput of HTS and HCS, and one that corrects for irregularities in the sample plate. The present invention fulfills this need in the art.

SUMMARY OF THE INVENTION

In one aspect, the invention provides a method for determining a best initial focal position estimate for a current sample location on a substrate comprising multiple sample locations, comprising determining the best initial focal position estimate by using a result from one or more techniques selected from the group consisting of linear regression analysis of focal positions determined for at least two other sample locations on the substrate and quadratic regression analysis of focal positions determined for at least three other sample locations on the substrate.

In another aspect, the invention provides a method for autofocusing sample locations on a substrate comprising determining a focal position for a first sample location on the substrate and a second sample location on the substrate, estimating a best initial focal position for a third sample location on the substrate by using a result from linear regression analysis of the focal position for the first sample location and the second sample location, focusing to obtain a focal position for the third sample location, estimating a best initial focal position for a fourth sample location on the substrate by using a result from one or more techniques selected from the group consisting of linear regression analysis of focal positions determined for at least two other sample locations on the substrate and quadratic regression analysis of focal positions determined for at least three other sample locations on the substrate, focusing to obtain a focal position for the fourth sample location, and repeating the final two steps for a desired number of sample locations on the substrate.

In another aspect, the invention provides a computer readable storage medium comprising a program containing a set of instructions for causing a cell screening system to execute the procedures of the above methods.

DETAILED DESCRIPTION OF THE INVENTION

The present invention provides autofocusing methods that are faster than previous methods, and that take into account irregularities in the substrate/sample locations of the sample being analyzed, thus greatly reducing autofocus failure rates and maximizing the amount of information that can be generated from HTS and HCS. The invention applies to any type of microscopy where a specimen(s) must be examined over more than one field including, but not limited to, microscopy of biological specimens (such as cells and tissue sections), microelectronic specimens, forensic specimens, and food science specimens.

In one aspect, the invention provides a method for determining a best initial focal position estimate for a current sample location on a substrate comprising multiple sample locations, comprising determining the best initial focal position estimate by using a result from one or more techniques selected from the group consisting of linear regression analysis of focal positions determined for at least two other sample locations on the substrate and quadratic regression analysis of focal positions determined for at least three other sample locations on the substrate.

As used herein the term "sample location" refers to a subsection within a larger substrate containing a specimen(s) spread in space that is to be optically imaged. In a preferred embodiment, the specimen comprises a plurality of cells spread in space on the substrate.

Substrates for use with the present invention include, but are not limited to, glass and plastic bottom microtiter plates, glass or plastic slides, chemically patterned substrates comprising cell binding locations, petri dishes, and laboratory flasks. The subsections within a larger substrate may include, but are not limited to, wells such as those of a microtiter plate, cell binding locations on a chemically patterned surface, and user-defined subsections of substrates. The number of sample locations is a user definable parameter. In a preferred embodiment, the substrate is a microtiter plate, and the sample locations comprise wells on the microtiter plate.

By estimating a best initial focal position for a given sample location according to the methods of the invention, processing speed is increased by limiting the search range for finding the final focal position for the sample location. Processing time is reduced to roughly one fifth of the time required for focusing using an exhaustive search method, as in prior autofocusing methods.

As used herein, the term "best initial focal position" is defined as the best approximation of the focal plane for a given sample location. "Focal plane" is defined as the plane perpendicular to the optical axis at the Z coordinate of the specimen for a particular set of X and Y coordinates.

As used herein, the term "linear regression analysis" is defined as the fitting of a model such as a line or plane through a given set of points according to a specified goodness-of-fit criterion to yield the parameters of an appropriate linear function. The analysis requires a minimum of two data points and may be conducted by a linear least squares method, or any other suitable method that minimizes the discrepancies between the data and the model used to fit the data.

As used herein, the term "quadratic regression analysis" is defined as the fitting of a model such as a parabola or a quadratic surface through a given set of points according to a specified goodness-of-fit criterion to yield the parameters of an appropriate quadratic function. The analysis requires a minimum of three data points and may be conducted by a least squares method, or any other suitable method that minimizes the discrepancies between the data and the model used to fit the data.

The estimate of the best initial focal position for a current sample location may be based on the results obtained from linear regression analysis only. In a preferred embodiment, the estimate of the best initial focal position for a current sample location is based on results from quadratic regression analysis. For example, one could adaptively select one or the other analyses by selecting the analysis that has provided the result closest to the correct focal position for the greatest number of prior sample locations. In an even more preferred embodiment, the estimate of the best initial focal position for a current sample location is based on results from both quadratic regression analysis and linear regression analysis, such as by determining an average of results from the two analyses. For example, it could be as simple as adding the two estimates together and dividing by two. Even more preferably, a weighted average of results from the two analyses are used. For example, one could adaptively weigh one or the other analysis higher by selecting the analysis that has provided the result closest to the correct focal position for the greatest number of prior sample locations. Alternatively, a higher weight can be given to the quadratic estimate if the surface formed by the bottoms of the plate wells is curved. However, if the surface is formed by a tilted plane, it would be preferable to give higher weight to a linear estimate. Without prior knowledge of a plate, a simple average of the two estimates is preferable.

The methods of the invention can be used in conjunction with any cell screening system comprising (a) an imaging system comprising a light source and a camera or detector, preferably a camera, including, but not limited to, a digital camera or an analog video camera; (b) a focus positioning system including at least a microscope objective; (c) an XY positioning system including at least a stage; and (d) a control system comprising a central processing unit for receiving and processing data and for controlling automated functions of the cell screening system. Examples of such cell screening systems include, but are not limited to, fluorescence cell screening systems, scanning electron microscopy systems, and transmitted light microscopy systems.

Cell screening is a process in which cells are distributed in sample locations on a substrate, treated with one or more reagents, and monitored optically for phenotypic changes. For example, the cells may contain fluorescent reporter molecules, and the optical screening comprises monitoring fluorescent signals from the cells. In such an example, autofocus comprises focusing on the fluorescent signal emitted by the cells. In other examples, such as bright field microscopy, focusing can be performed on light absorbing objects such as cells.

The autofocus methods of the invention can be controlled by same central processing unit (CPU) that controls the cell screening system, or on a separate CPU.

In another aspect, the invention provides a method for autofocusing sample locations on a substrate comprising determining a focal position for a first sample location on the substrate and a second sample location on the substrate, estimating a best initial focal position for a third sample location on the substrate by using a result from linear regression analysis of the focal position for the first sample location and the second sample location, focusing to obtain a focal position for the third sample location, estimating a best initial focal position for a fourth sample location on the substrate by using a result from one or more techniques selected from the group consisting of linear regression analysis of focal positions determined for at least two other sample locations on the substrate and quadratic regression analysis of focal positions determined for at least three other sample locations on the substrate, focusing to obtain a focal position for the fourth sample location, and repeating the final two steps for a desired number of sample locations on the substrate.

Figure 1:
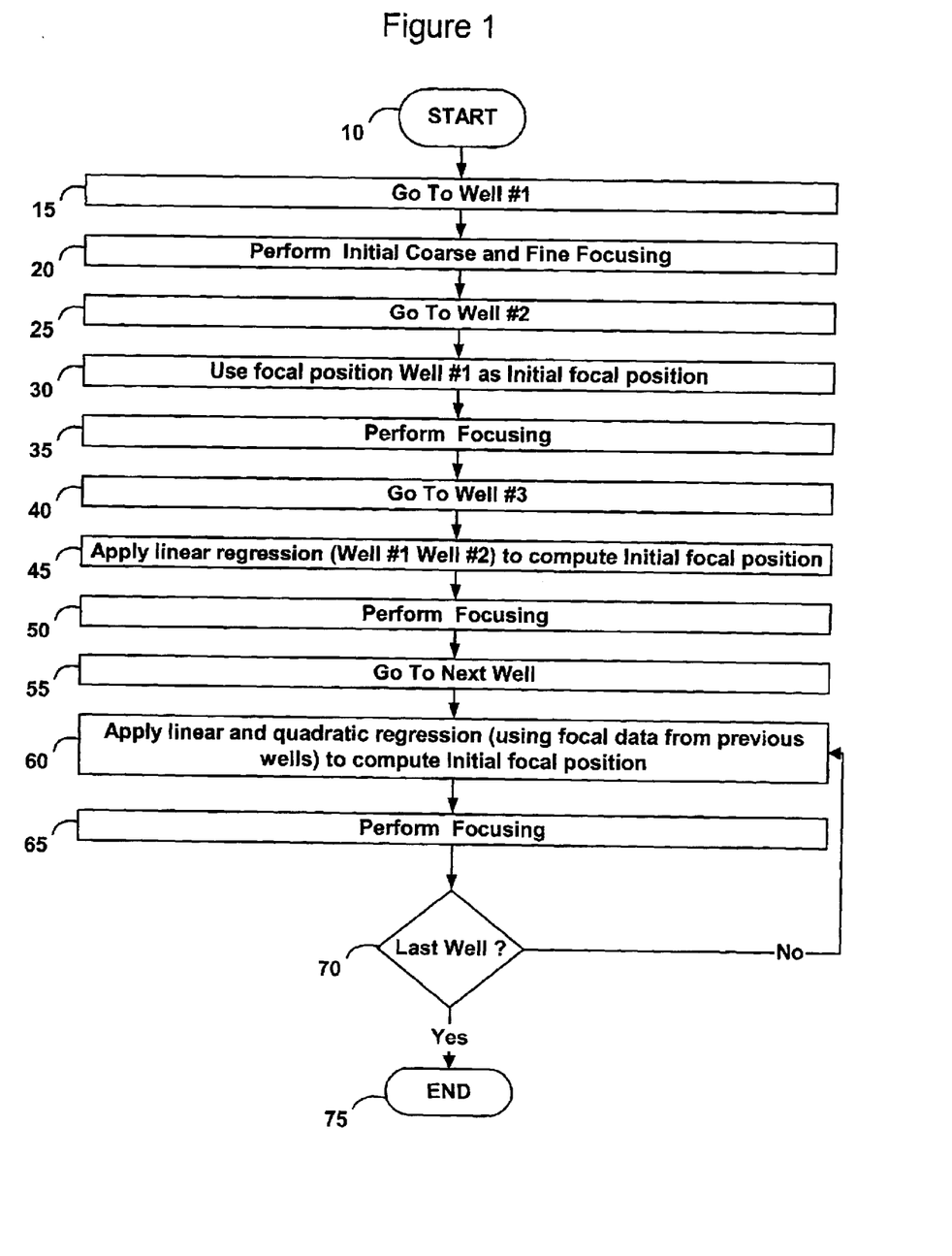
FIG. 1 is a flow chart showing a preferred embodiment of the autofocusing method of the invention.
Figure 2:
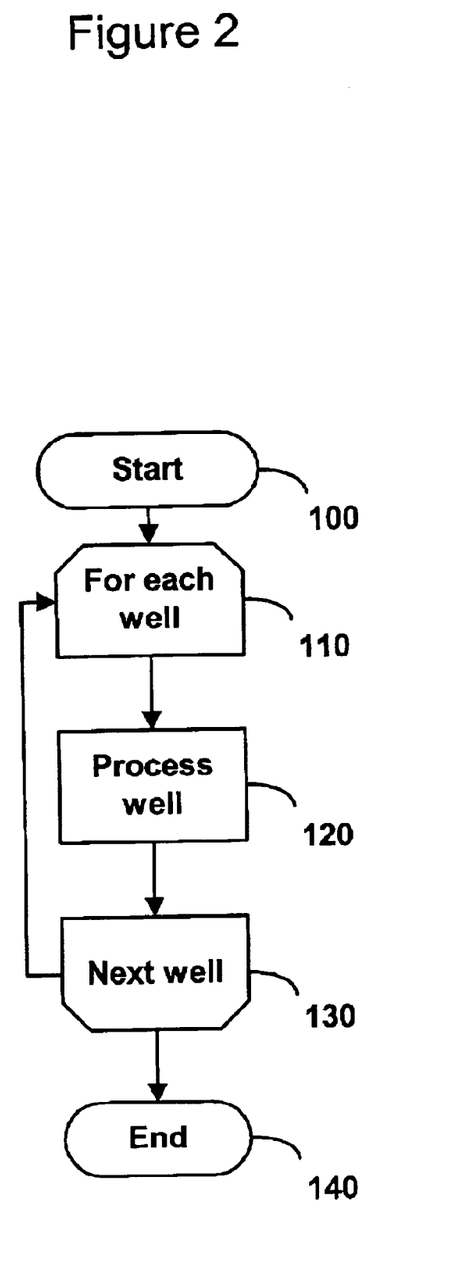
FIG. 2 is a flow chart showing a preferred procedure for analyzing a microtiter plate.

A preferred embodiment of this aspect is shown in FIG. 1 as applied to screening a microtiter plate with sample locations comprising wells. In the first step, the instrument is aligned to analyze the first well of the plate 15, and a search for focusing is conducted over a large range of focal planes 20. After moving to the second well 25, the focal position of the first well is used as the best initial focal position of the second well 30, and the focal position of the second well is subsequently determined by focusing through a narrower range of focal planes 35. The instrument is then aligned to analyze the third well 40. The best initial focal position of the third well is determined by linear regression analysis of the focal positions of the first and second wells 45, and the focal position of the third well is subsequently determined by focusing through a narrower range of focal planes 50. Upon alignment of the instrument to analyze the fourth and subsequent wells 55, the best initial focal position of the well is determined based on the results of a linear regression analysis and a quadratic regression analysis of all or a subset of the previous wells 60 as described above.

In this embodiment, "focusing through a narrower range of focal planes" comprises varying the best initial focal position in discrete increments, capturing a digital image of the sample location at each focal plane, and determining one or more focus quality metrics including, but not limited to, Laplacian energy, image variance, and gradient energy. As used herein, the term "focus quality metric" is defined as a number derived from the image that relates to the degree of focus. The sample location is in focus at the focal position where the focus quality metric is largest. The focus quality metric used is dependent on the cells being optically imaged.

The accuracy of the best initial focal position estimate is very important to produce reliable results. The closer the estimate is to the actual focal position, the higher the probability that the autofocus method will find the proper focal position, rather than detect a false focus quality metric.

The accuracy of the best initial focal position estimate is a function of the distance from the current position to the other sample locations on the substrate for which a focal position has been determined. The closer to the other focal positions, the higher the confidence of the estimate. Conversely, the further the distance, the lower the confidence. Thus, in a preferred embodiment, for subsequent sample locations on the substrate, the algorithm determines whether there are stored prior focal positions within a given distance of the current sample location, wherein the given distance is programmable via an input parameter, and is selected by an empirical process.

If there are stored prior focal positions within the given distance of the current sample location, the best initial focal position of the current sample location is determined by the methods of the invention, and the actual focal position is determined by a search for focus in a small range of focal planes about the best initial focal position, subsequent to which the X, Y, and Z coordinates of the current sample location are stored for future use. If there are no stored prior focal positions within a given radius of the current sample position, a search for focus is conducted over a large range of focal planes, as, for example, for the first sample location on a substrate.

Since resorting to an exhaustive search method is costly (in terms of time and in terms of photobleaching the sample), it is wise to select a scan pattern that minimizes the distance between the current position and the previous positions for which a focal position has been determined, thus maximizing the possibility of obtaining an accurate best initial focal position estimate. For the case of a microtiter plate, for example, it is therefore desirable to scan the wells in order of position (A1, A2, A3, . . . ), rather than in a disjointed fashion (A1, A10, A3, A5).

In another aspect, the present invention comprises a computer readable storage medium comprising a program containing a set of instructions for causing a cell screening system to execute a set of procedures for determining a best initial focal position estimate for a current sample location on a substrate comprising multiple sample locations, wherein the procedures comprise determining the best initial focal position estimate by using a result from one or more techniques selected from the group consisting of linear regression analysis of focal positions determined for at least two other sample locations on the substrate and quadratic regression analysis of focal positions determined for at least three other sample locations on the substrate.

In a further aspect, the present invention comprises a computer readable storage medium comprising a program containing a set of instructions for causing a cell screening system to execute a set of procedures for autofocusing sample locations on a substrate comprising determining a focal position for a first sample location on the substrate and a second sample location on the substrate, estimating a best initial focal position for a third sample location on the substrate by using a result from linear regression analysis of the focal position for the first sample location and the second sample location, focusing to obtain a focal position for the third sample location, estimating a best initial focal position for a fourth sample location on the substrate by using a result from one or more techniques selected from the group consisting of linear regression analysis of focal positions determined for at least two other sample locations on the substrate and quadratic regression analysis of focal positions determined for at least three other sample locations on the substrate, focusing to obtain a focal position for the fourth sample location, and repeating the final two steps for a desired number of sample locations on the substrate.

The computer readable medium includes but is not limited to magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or are distributed among multiple interconnected processing systems that may be local or remote to the processing system.

In a preferred embodiment of this aspect of the invention, the cell screening system comprises an imaging system, a focus positioning system, an XY positioning system, and a control system, as defined above.

The present invention may be better understood with reference to the accompanying examples that are intended for purposes of illustration only and should not be construed to limit the scope of the invention, as defined by the claims appended hereto.

EXAMPLES

Example 1

Regression Analysis

Problem: Given a number of tag points $(x_i, y_i, z_i)$, fit a mathematical function to these points and use this function to determine an estimate for best focus $Z_{best}$ for other x, y. "Tag point" is defined as a particular set of X, Y, and Z coordinates representing a focal position for a sample location previously focused. As used herein, $Z_{best}$ is defined as the Z value corresponding to the focal position for a given set of X and Y coordinates.

Based on the number of tag points within a predefined radius of the current sample location for which an initial estimated focal plane is needed, the following preferred analyses can be performed:

1 tag point: The "z" from that tag point is used as the initial estimated focal plane for the current sample location.

2 tag points: An exact line through those two tag points (linear model) is defined and used to determine the estimated focal plane for the current sample location.

3 tag points all in the same column or row on the substrate: An exact parabola through these 3 tag points (quadratic model) in addition to the best fit line through the tag points (linear model) is defined and used to determine the estimated focal plane for the current sample location.

3 tag points not all in the same column or row on the substrate: An exact plane through these three tag points is defined and used to determine the estimated focal plane for the current sample location.

4 or more tag points all in the same column or row on the substrate: A weighted, best fit parabola through all tag points (quadratic model) in addition to the best fit line through the three closest tag points (linear model), is defined and used to determine the estimated focal plane for the current sample location.

4 or more tag points not all in the same column or row: A weighted, best fit quadratic surface through all tag points (quadratic model) in addition to the exact plane through the three closest tag points (linear model) is defined and used to determine the estimated focal plane for the current sample location. One type of a quadratic surface is the paraboloid shown in the microtiter plate example.

Example 2
Background on Regression in Two Dimensions

In a preferred embodiment, the problem of linear regression can be simply stated:

GIVEN
1. A table of data
2. a hypothesized linear model $$y = ax + b,$$

FIND

The parameters a and b which determine the line which BEST FITS the given data.

To measure how well the fit is between the linear model and the data points, a MEASURE OF DISCREPENCY at the data points is determined. There are several possibilities, including, but not limited to, the following 3 examples:

$$M := \max_{1 \le i \le n} |y_i - ax_i - b|,$$

$$S := \sum_{i=1}^{n} |y_i - ax_i - b|,$$

or $$L := \sum_{i=1}^{n} |y_i - ax_i - b|^2.$$

A linear least squares method uses the third of the measures in the last list:

$$L := \sum_{i=1}^{n} |y_i - ax_i - b|^2.$$

This function is a function of the parameters a and b. Since the goal is to get a best fit according to this measure, it is desirable to MINIMIZE this function as a function of these two parameters.

To do this, the usual necessary conditions for a minimum from calculus are used, namely:

$$\frac{\partial L}{\partial a} = 0$$

$$\frac{\partial L}{\partial b} = 0$$

from which equations which are to be solved for the parameters a and b can be computed. An example of a linear regression analysis for a line is as follows:

$$y = ax + b$$

where a and b are constants that need to be found for a given set of X and Y $$a \left( \sum_{i=1}^{n} x_i^2 \right) + b \left( \sum_{i=1}^{n} x_i \right) = \sum_{i=1}^{n} x_i y_i$$

$$a \left( \sum_{i=1}^{n} x_i \right) + nb = \sum_{i=1}^{n} y_i$$

| x | 2 | 3 | 5 | 6 |
|---|---|---|---|---|
| y | 1 | 3 | 4 | 6 |

$\sum x_i^2 = 4 + 9 + 25 + 36 = 74$ $\sum x_I = 2 + 3 + 5 + 6 = 16$ $\sum y_I = 1 + 3 + 4 + 6 = 14$ $\sum x_i y_I = 2 + 9 + 20 + 36 = 67$ n=4

It yields the system of equations:

$74a + 16b = 67$ $16a + 4b = 14$

The solution of which is $a = 1.1; b = -0.9$

Finally, the linear regression line is:

$y = 1.1x - 0.9$

Figure 9:
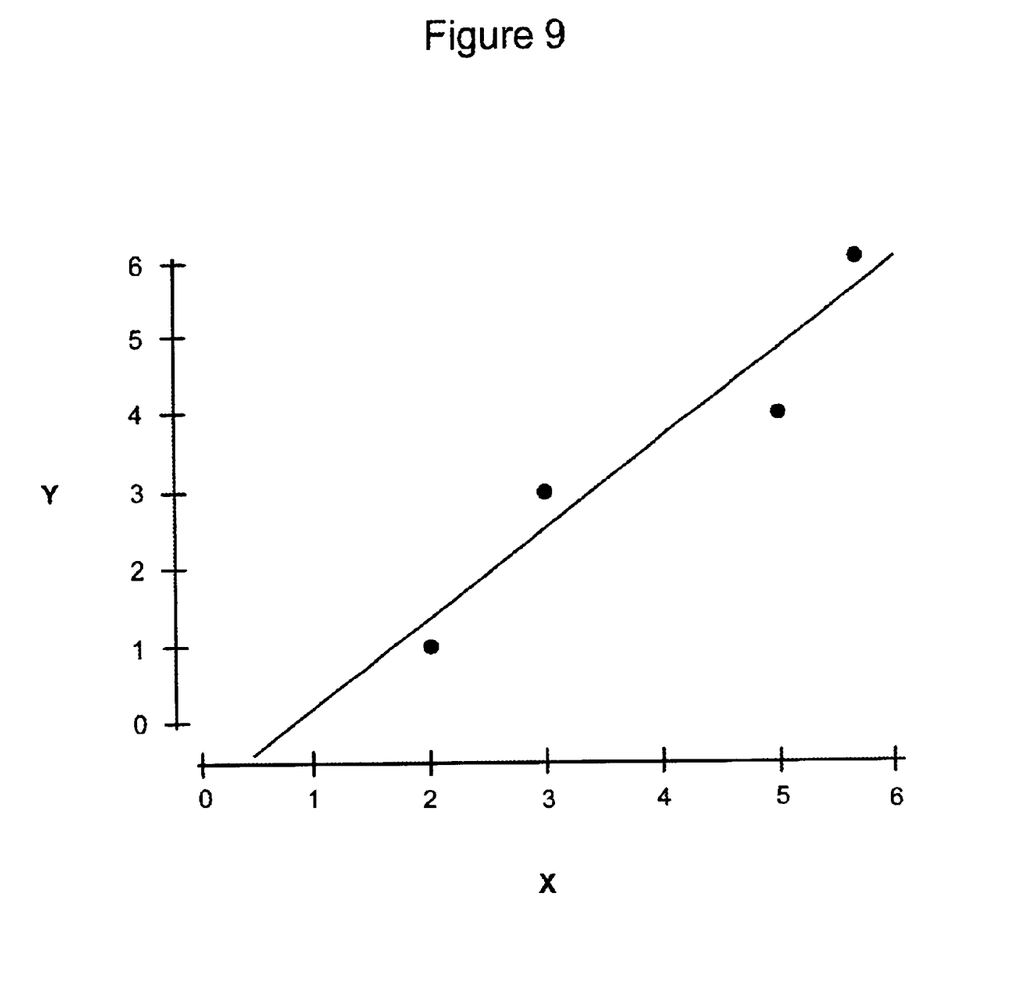
FIG. 9 is a graphical depiction of a linear regression analysis for four data points.

See FIG. 9 for a plot of the data and the best fit line.

Now for any value x, we can find an estimate of the corresponding y. For example, for x=4 the estimate for y=1.1*4−0.9=3.5.

Quadratic Problem

The same techniques as those demonstrated for the linear least squares can be used to find the equations for the problem of fitting a quadratic (polynomial)

$$y = ax^2 + bx + c$$

Example 3
Cell Screening of a Microtiter Plate

A detailed example of the use of the autofocus methods of the invention in a method for screening a microtiter plate, where the sample locations are wells comprising cells, is presented in FIGS. 2–5. The analysis of a microtiter plate (FIG. 2) is started 100 with a first well 110. The well is processed 120, the instrument is realigned to analyze the next well 130, and steps 110 to 130 are repeated until all wells have been analyzed 140.

Figure 3A:
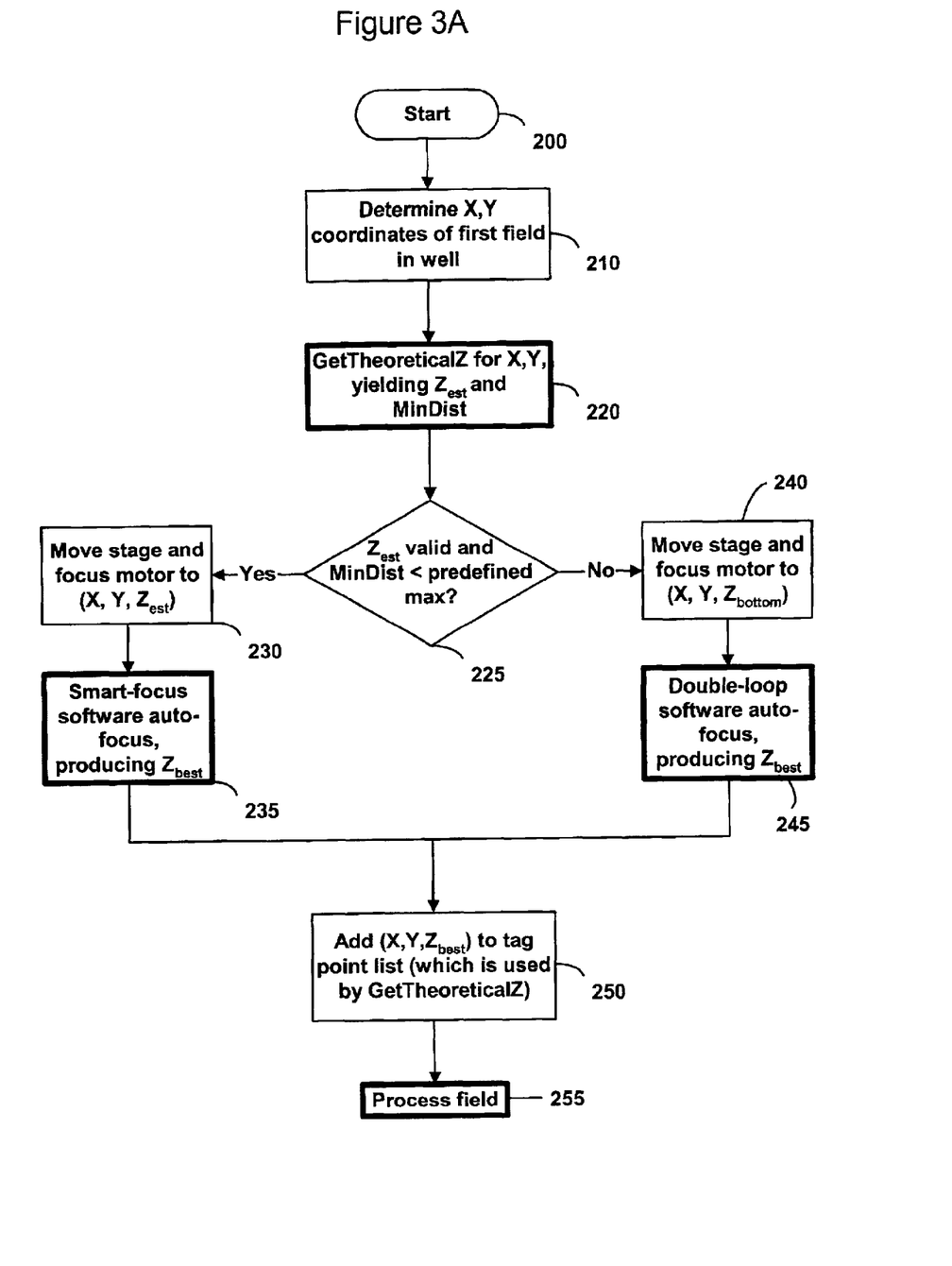
FIG. 3A is a flow chart showing a preferred method for processing a single well within a microtiter plate.
Figure 3B:
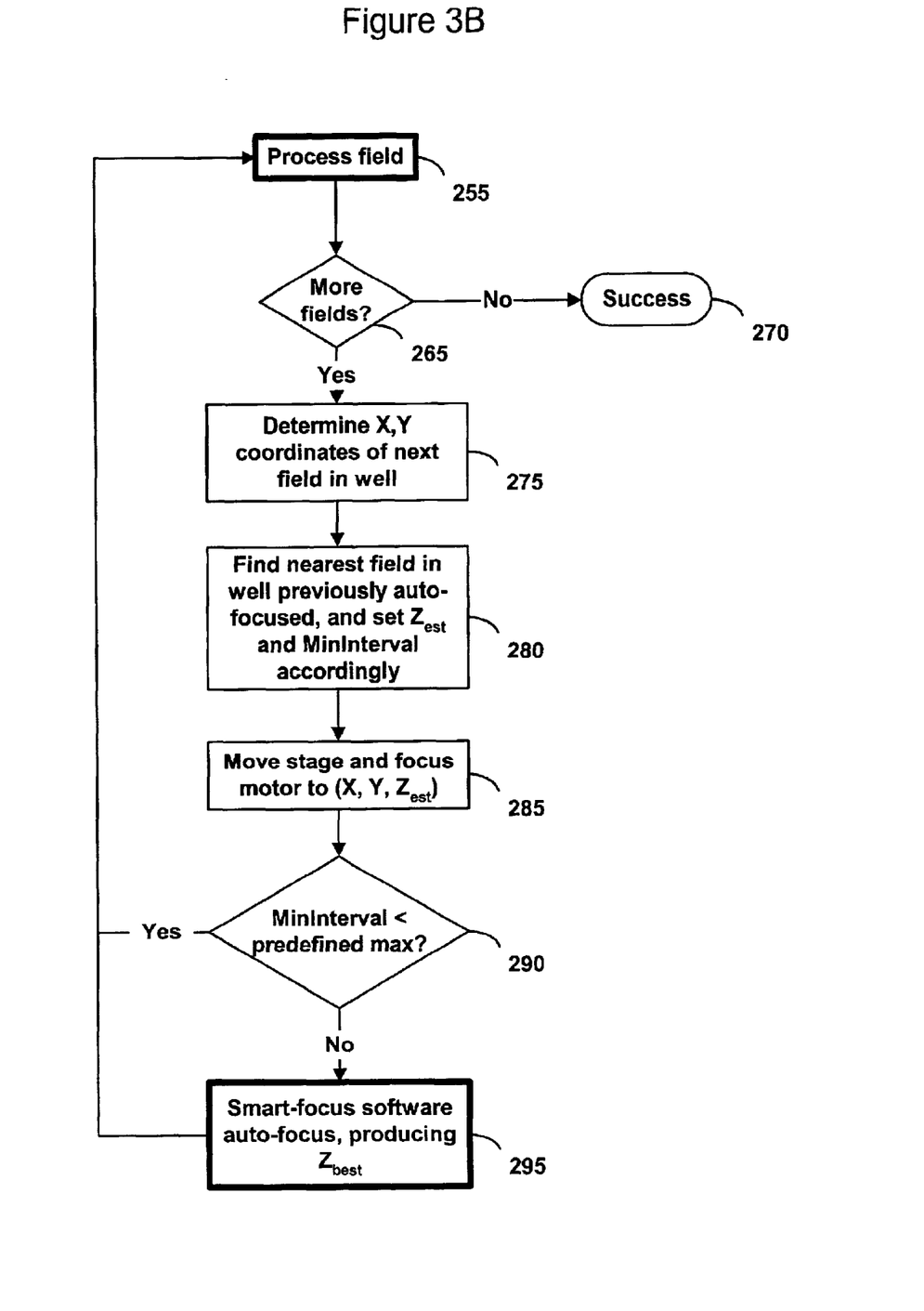
FIG. 3B is a flow chart showing an example of a method for processing multiple fields within a well of a microtiter plate.

Each well is processed by a method that comprises autofocusing the well based on the autofocus method of FIG. 3A and processing the fields within the well (FIG. 3B). Referring to FIG. 3A, the method begins 200 by determining the X and Y coordinates of the first field within the well 210, followed by determining the best initial focal position (herein referred to as $Z_{est}$) for that field 220.

Determining $Z_{est}$ (FIG. 4) requires an input of the number of tag points previously determined. As used herein 305, N represents the number of tag points stored. "Tag point" is defined as a particular set of X, Y, and Z coordinates representing a focal position for a sample location previously focused. Initially 300 a determination is made as to whether more than one tag point for the substrate has previously been determined and stored on the system database 305. If no tag points have been stored, such as for the first well on a substrate and such that N is equal to zero 310, no determination of $Z_{est}$ results 315. In this instance, the validity of $Z_{est}$ 225 is negative, and the instrument is adjusted to move to $Z_{bottom}$ 240. As used herein, $Z_{bottom}$ is defined as a user-configurable parameter representing a Z value such that the focal plane of a given sample location is guaranteed to lie above it. The focal position for the sample location is then determined by analyzing focus quality metrics over a large range of focal planes as described above to yield $Z_{best}$ 245. As used herein, $Z_{best}$ is defined as the Z value corresponding to the focal position for a given set of X and Y coordinates. Such a $Z_{best}$ determination can be performed, for example, by the Double-loop software autofocus procedure (FIG. 5), comprising a process of coarse and fine focusing. During coarse focusing, an approximate focal region is identified for the sample location using large steps of stage movement, wherein a "focal region" represents a set of focal planes to be analyzed. In fine focusing, the final focal position is determined by stepping through the approximate focal region in much smaller steps. Once $Z_{best}$ has been determined, the values of X, Y, and Z for the current sample location are stored to a tag point list 250, and the first field in the sample location is processed 255 by analyzing the field as desired.

Additional fields within the sample location may be processed as shown in FIG. 3B. As used herein, "field" is defined as the extent of the sample in the XY plane captured in a single image. For example, a well on a microtiter plate may comprise a single field at low magnification, such as 1.25×, or multiple fields at higher magnification (10× and above, depending on well size). Once a field has been processed 255, the need to analyze additional fields within the sample location is determined 265. If the analysis of additional fields is required, the X and Y coordinates of the next field are determined 275 and the value of $Z_{est}$ for the next field is set to equal the value of $Z_{best}$ determined for the nearest field within the sample location 280. Additionally, a MinInterval is set 280. As used herein, "MinInterval" is defined as the distance between the next field and nearest field within the sample location. The stage and focus motor are moved to the X, Y, and $Z_{est}$ coordinates of the next field 285 and MinInterval is compared to a user-programmed predefined maximum 290, wherein the predefined maximum serves to determine whether it is necessary to focus additionally beyond $Z_{est}$, based on the proximity of the next field to a previously autofocused field. If MinInterval is less than the predefined maximum 290, the field is processed 255 by analyzing the field as desired. If the MinInterval is greater than the predefined maximum 290, the actual focal position of the field is determined by a search for focus in a small range of focal planes about $Z_{est}$ to produce $Z_{best}$ 295, and the field is then processed 255. When all fields in the sample location have been processed, the processing of the first sample location is complete 270, the instrument is adjusted to analyze the second sample location 130, and that sample location 110 is then processed 120.

Figure 6A:
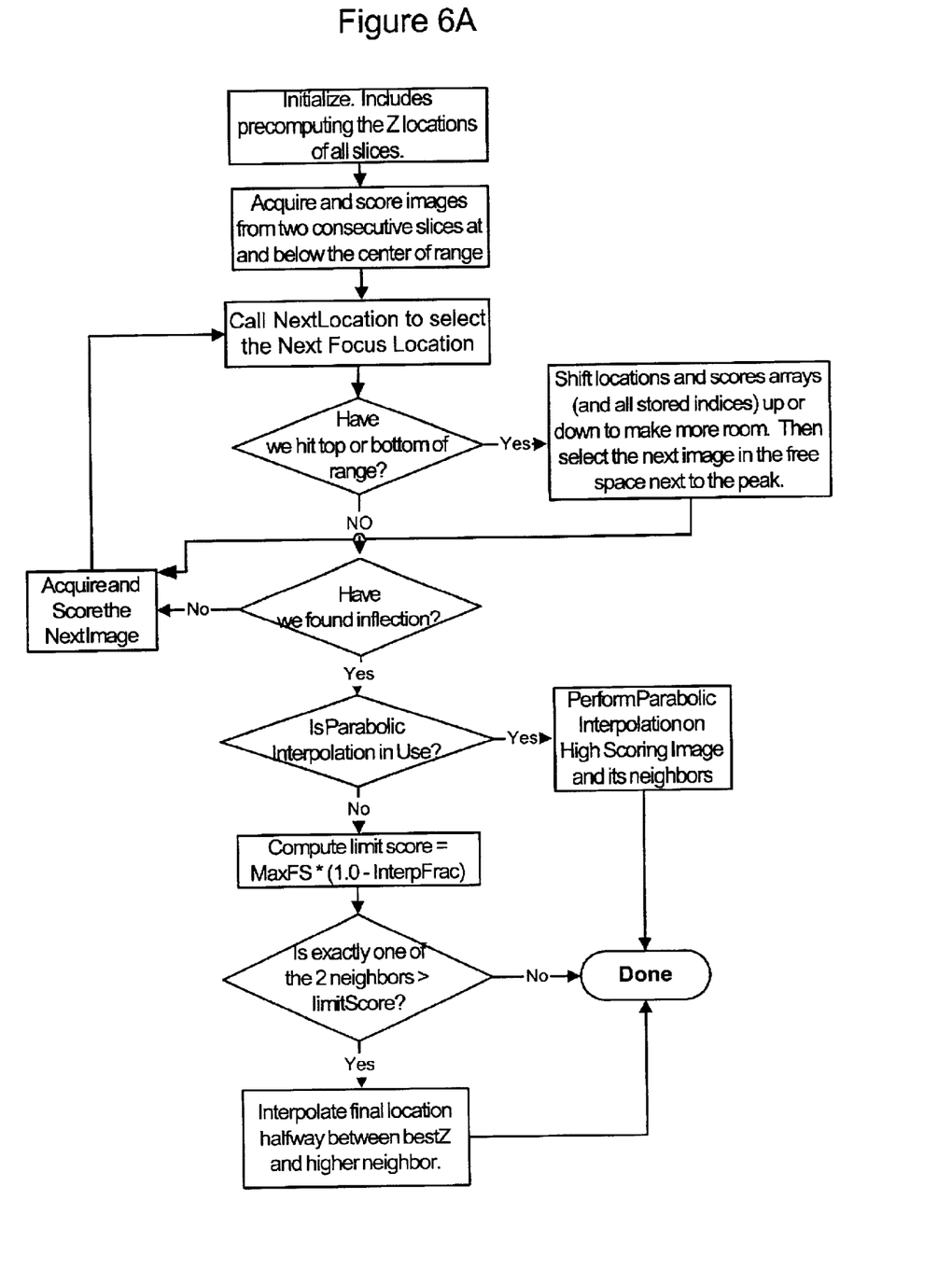
FIGS. 6A and 6B are flow charts showing a smart-focus procedure.
Figure 6B:
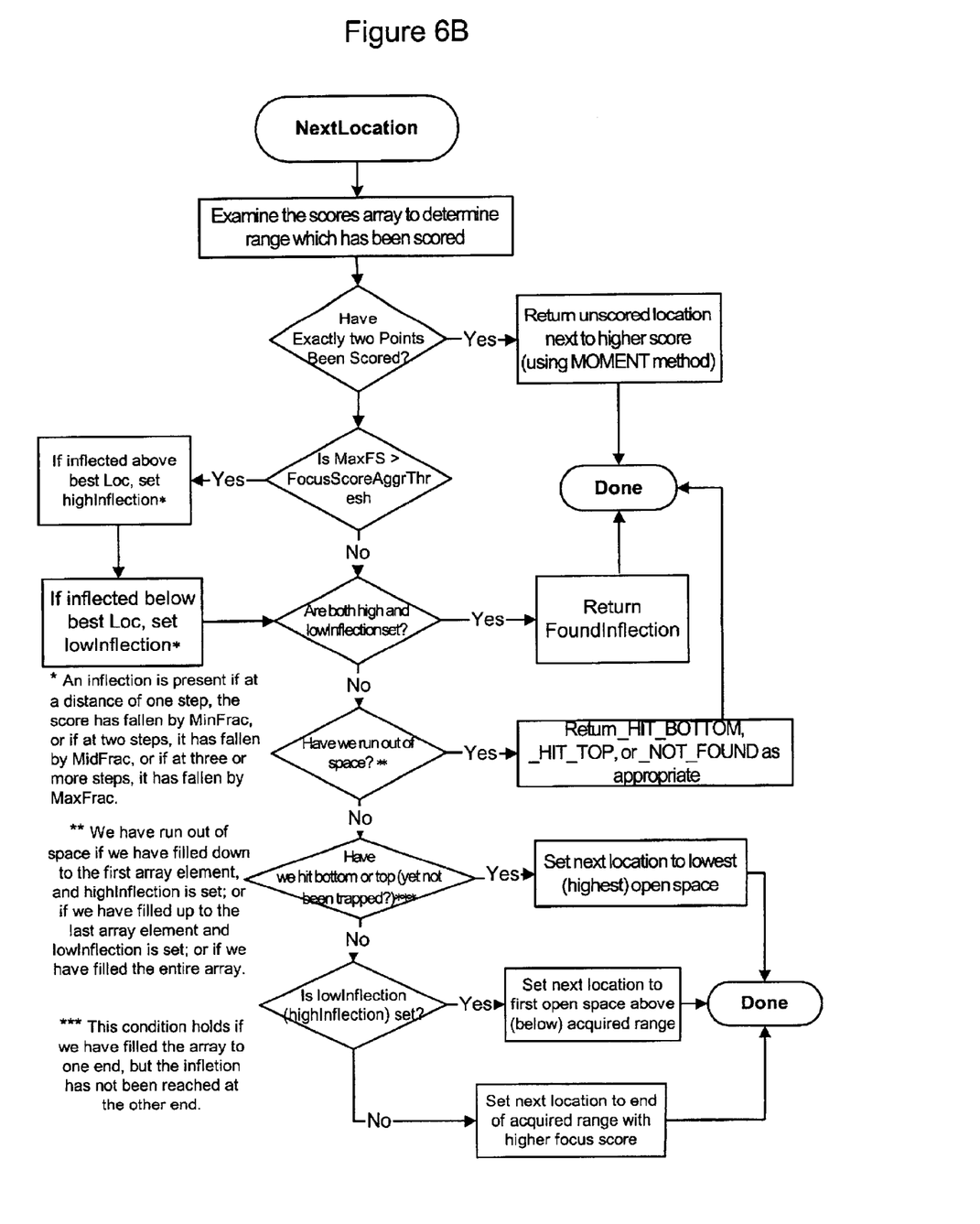

Analysis of the second sample location begins with a determination of the X and Y coordinates of the first field within the well 210 followed by determination of $Z_{est}$ and MinDist 220. As used herein, MinDist is defined as the distance to the nearest focal position (tag point) in the list of focal positions (tag points) stored for the substrate. The predefined maximum of MinDist is a user-programmed parameter that is determined empirically. For the second sample location on the microtiter plate, one tag point has been determined, representing the focal position of the first sample location. N is not greater than one 305 nor equal to zero 310, and therefore $Z_{est}$ is set to the focal position of the preceding sample location and MinDist is set to have a value of zero 320. A determination of the validity of $Z_{est}$ and the value of MinDist relative to the predefined maximum is then made 225. With verification that $Z_{est}$ is valid and that MinDist is less than the predefined maximum, the stage and focus motors of the instrument are moved to the X, Y, and $Z_{est}$ coordinates of the current sample location 230, and the focal position is determined by searching over a small range of focal planes 235 to yield $Z_{best}$ for the current sample location. Such a $Z_{best}$ determination can be performed, for example, by the Smart-focus procedure (FIG. 6), which starts at $Z_{est}$, moves the mechanical Z-axis through a number of different positions, acquires an image at each position, and computes a focus quality metric for each image. The Z value corresponding to the image with the maximum focus quality metric determines the $Z_{best}$ for a particular field. This method assumes the starting position is accurate such that the local maxima is the global maxima (i.e. there are no false focus quality metrics). With the determination of $Z_{best}$, the values of X, Y, and $Z_{best}$ for the current sample location are stored to the tag point list 250, and the first field in the well is processed 255 by analyzing the field as desired. Subsequent fields in the well are processed as described above for the first well.

Figure 4:
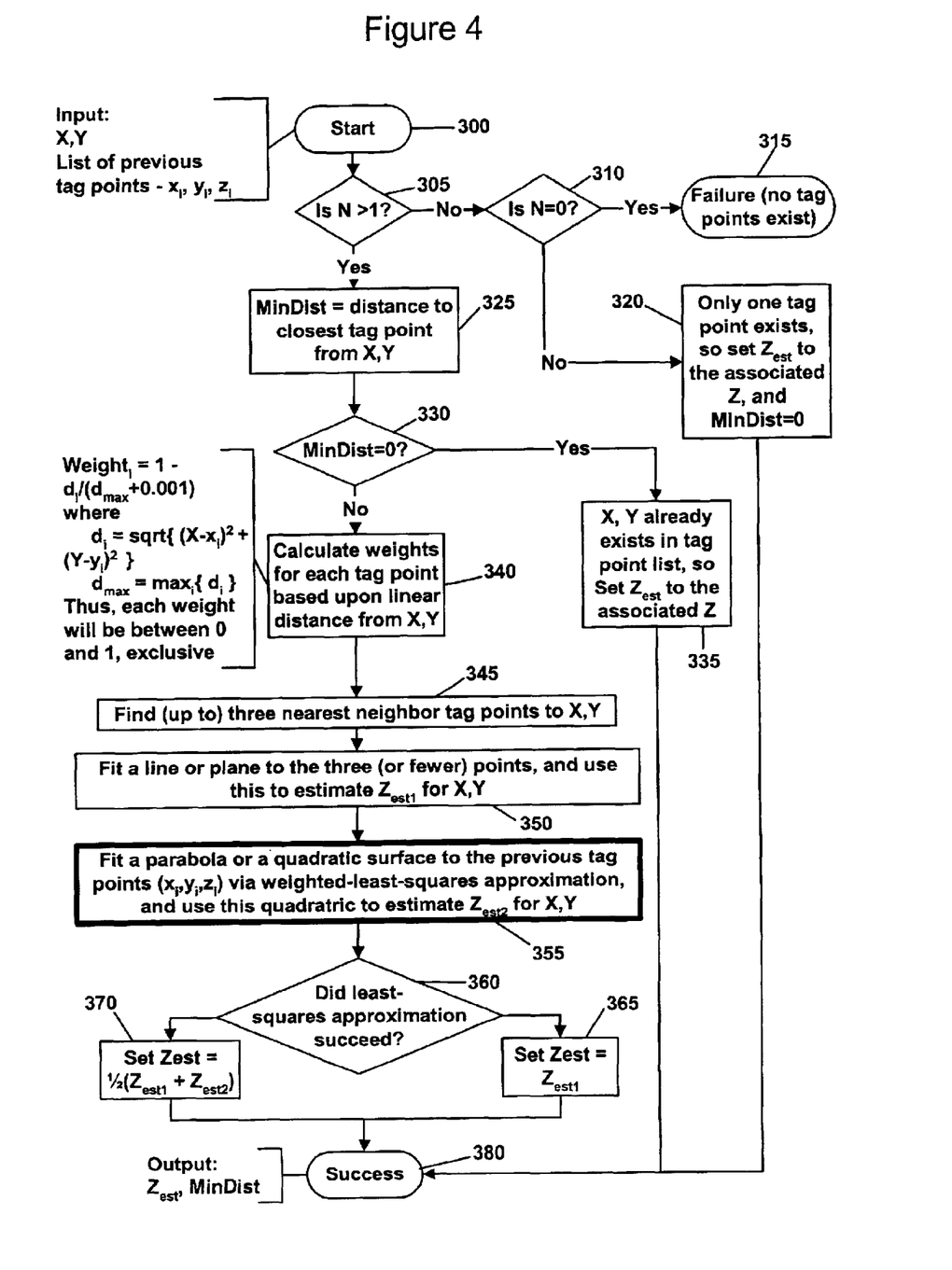
FIG. 4 is a flow chart describing a preferred embodiment of the autofocus methods of the invention.
Figure 5A:
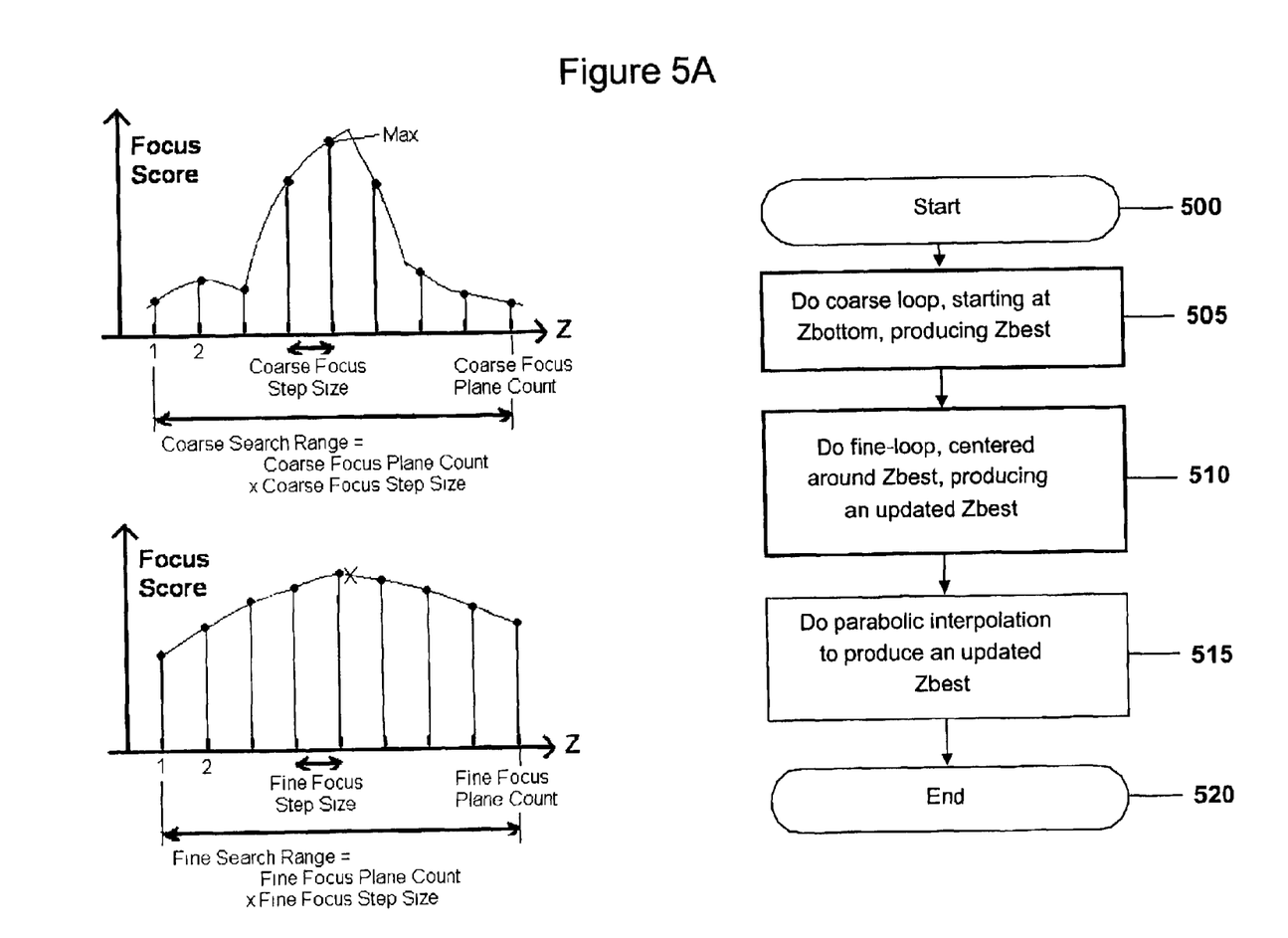
FIG. 5 is a flow chart showing a double-loop software auto-focus procedure.
Figure 5B:
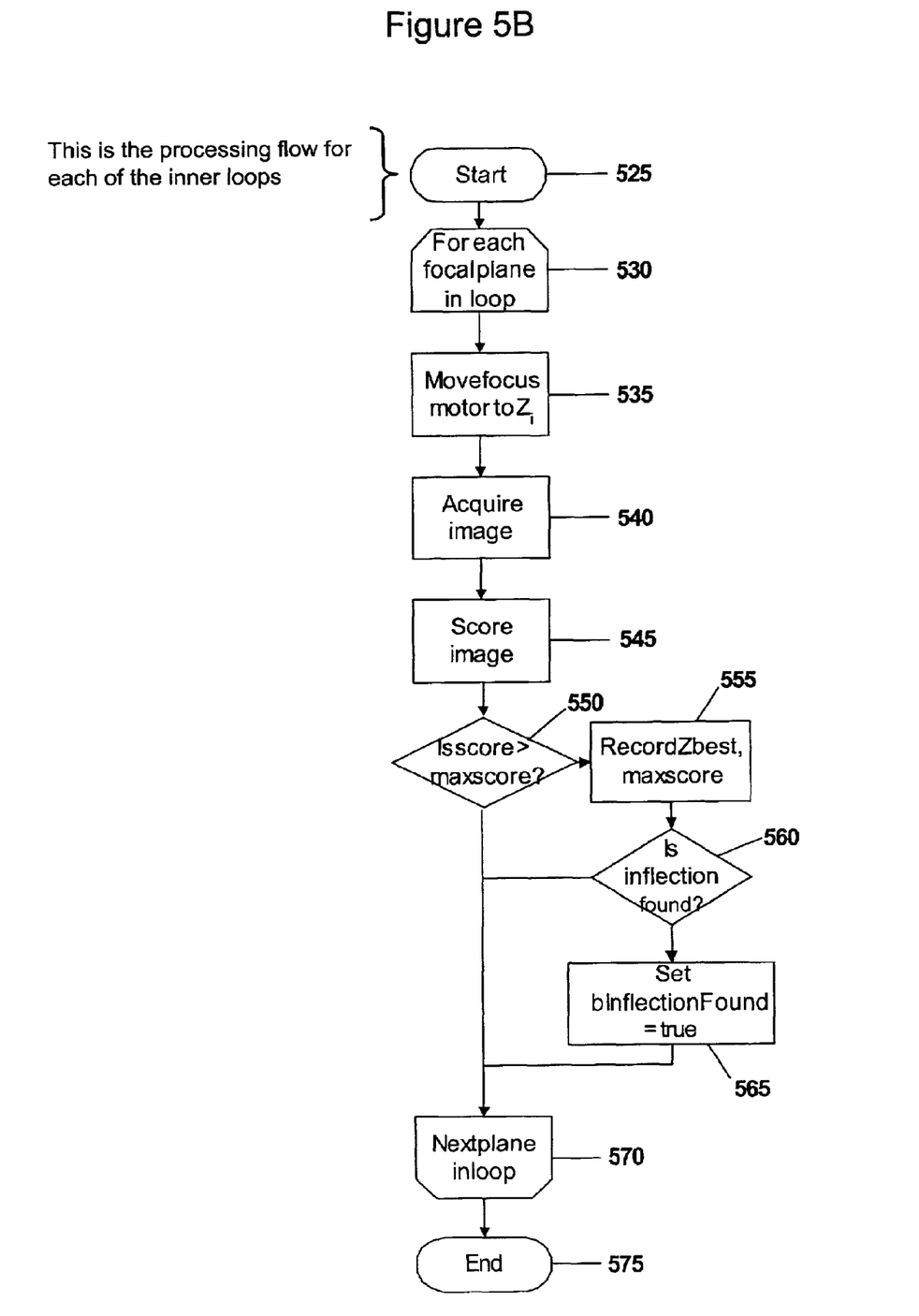

The instrument is then adjusted to analyze the next well 130, and that well 110 is then processed 120. For the third and subsequent sample locations of the microtiter plate, N>1 305. MinDist is set to equal the distance from the current sample location to the closest tag point 325 and then checked to determine if it is equal to zero 330. If MinDist is equal to zero, the current sample location corresponds to a previously determined tag point, and $Z_{est}$ is set to the Z value associated with the focal position of that tag point 335 to prevent refocusing on a previously focused sample location.

If MinDist is not equal to zero, both a linear regression analysis and a quadratic regression analysis are performed on the stored tag points. Preferably, the tag points are weighted in inverse proportion to their distance from the current point by a weighting process prior to regression analysis 340, such that a local rather than a global match to the particular model is enforced.

For the linear regression analysis, the nearest two or more tag points to the current sample location are found 345 and a model, either a line or a plane, selected based on the number and configuration of tag points, is fit to the points to determine $Z_{est}$ 350. As used herein, $Z_{est}$ is the best initial focal position as determined by linear regression analysis. If only two tag points have been stored, the linear regression analysis is performed by fitting a line to the data, in this case the exact line defined by the two tag points. If three or more tag points are selected, the linear regression analysis is performed by fitting either a line or a plane to the data. If all the projections of tag points onto the Z=0 plane exist along the line, e.g. along the same column or row of the microtiter plate, a line is fit to the tag points. If the projections of tag points onto the Z=0 plane are not all in the same line, a plane is fit to the tag points.

Figure 7:
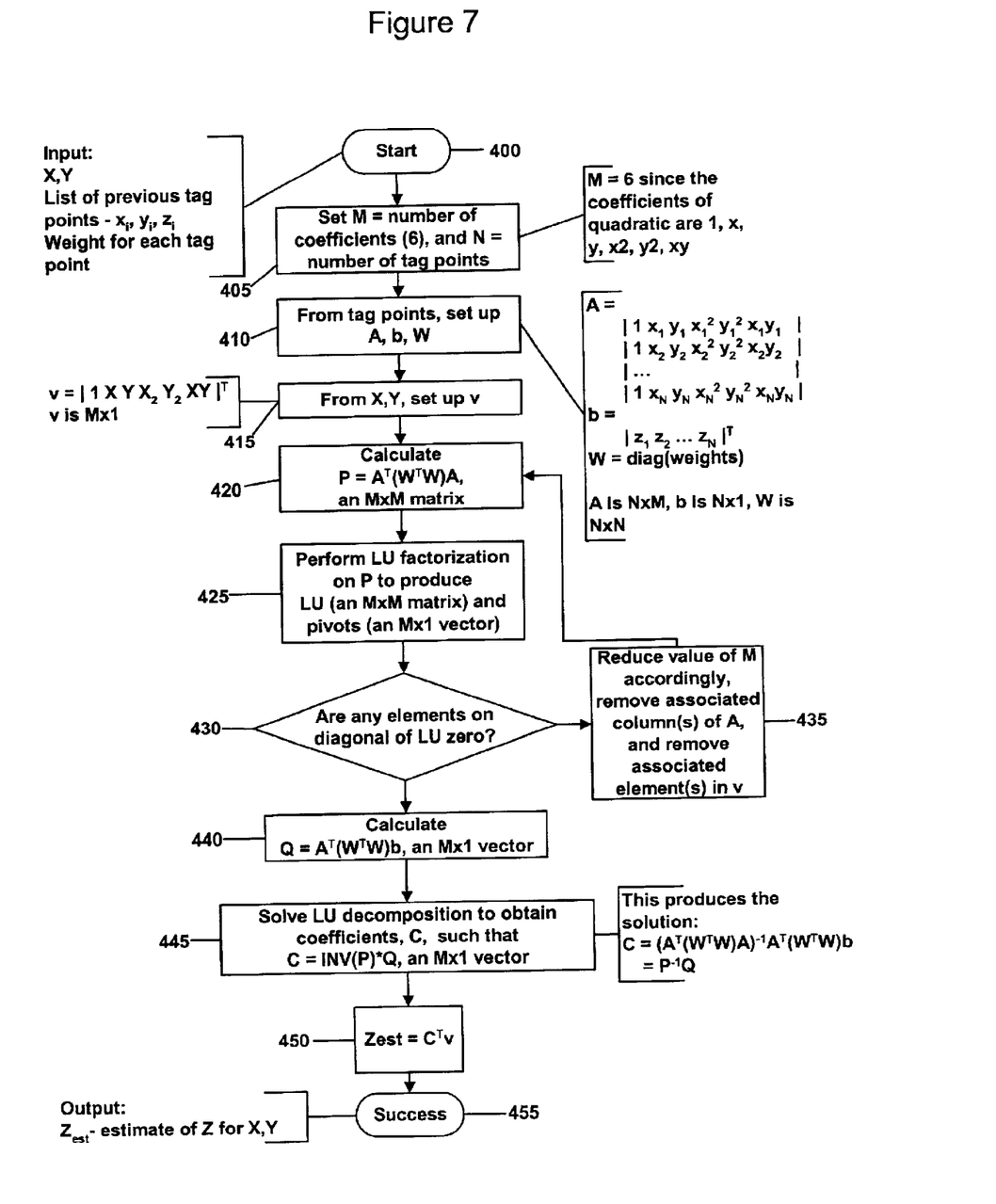
FIG. 7 is a flow chart showing a preferred Calculate Weighted Least Squares Estimate algorithm.
Figure 8A:
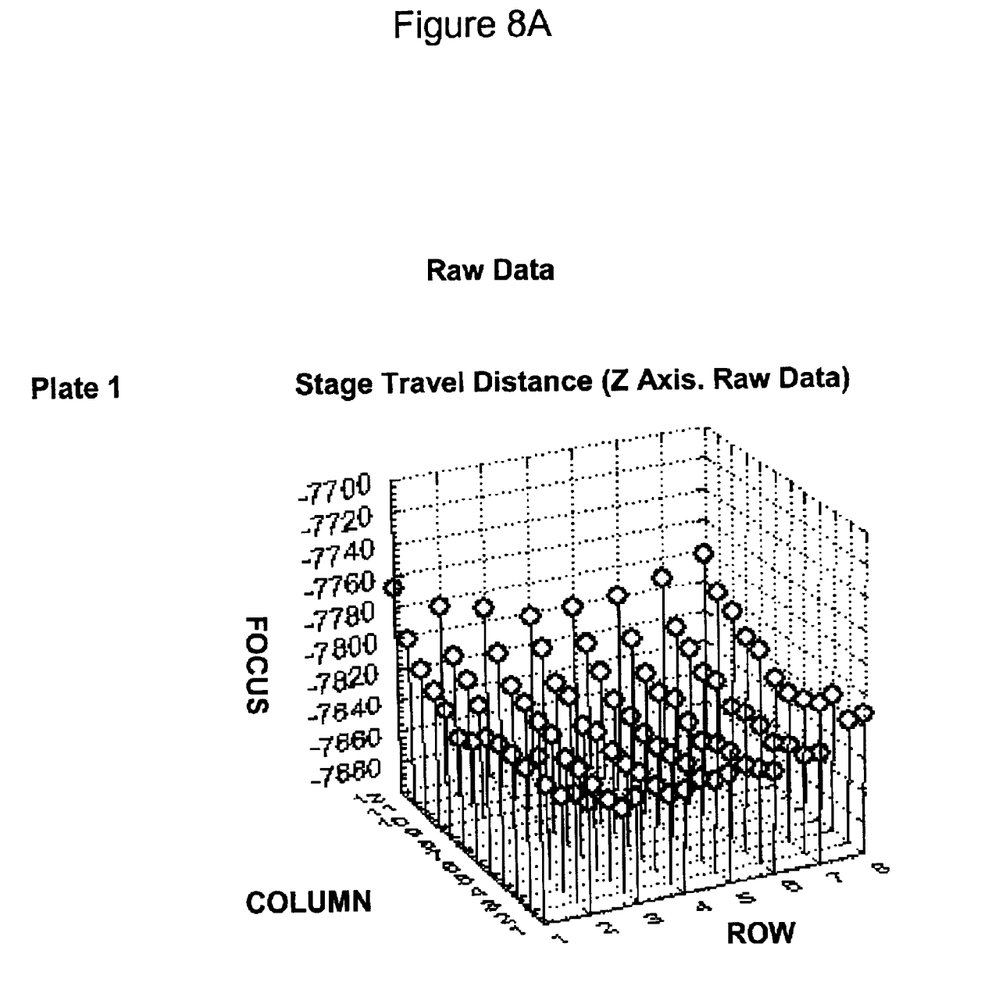
FIG. 8 is a graphical depiction of a linear regression analysis and a quadratic regression analysis of raw focus data of a microtiter plate.
Figure 8B:
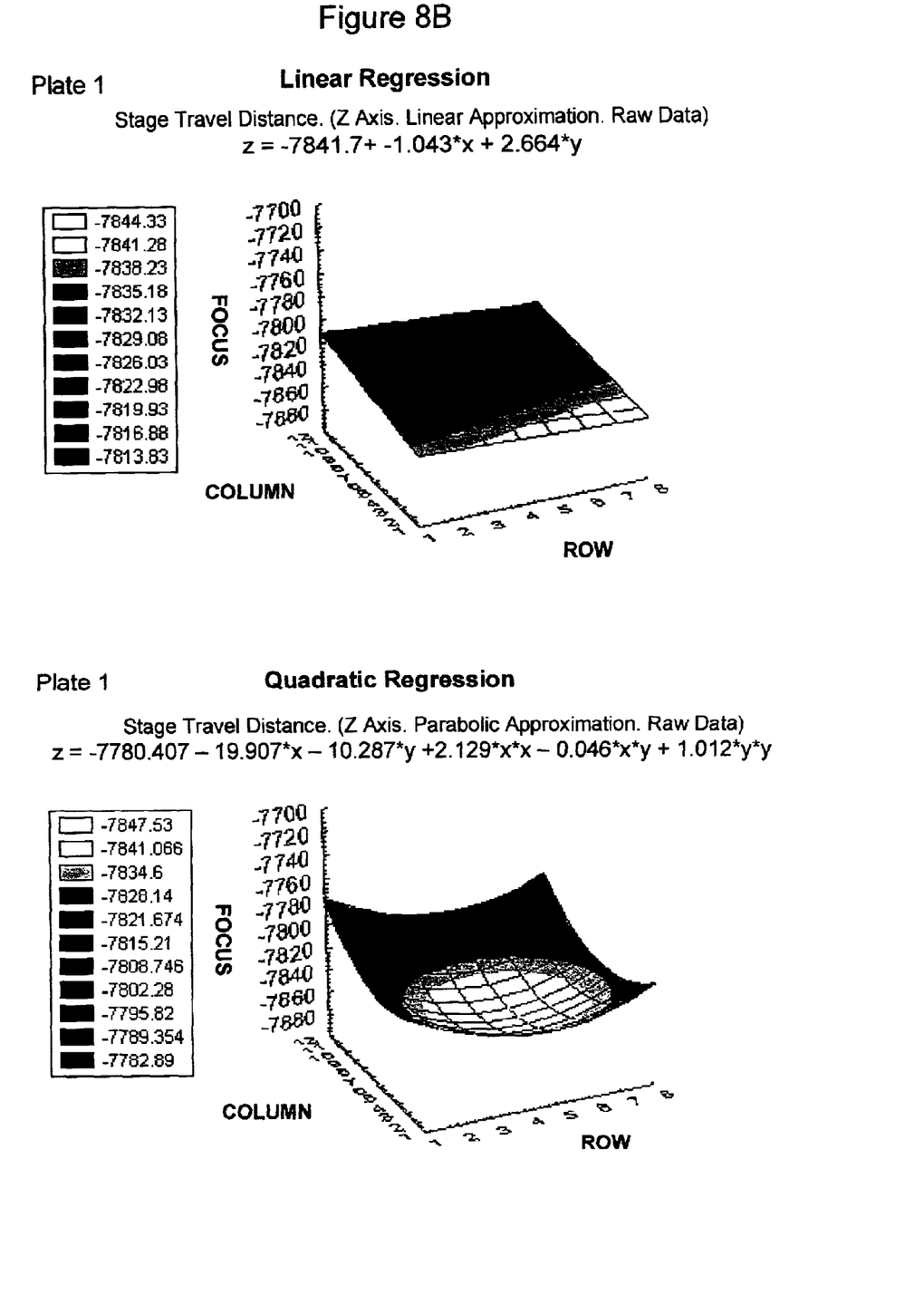

For the quadratic regression analysis 355, at least 3, or preferably all previous tag points are analyzed and a model, either a parabola or a quadratic surface, selected based on the number and configuration of tag points, is fit to the points to determine $Z_{est2}$ via a weighted least squares approximation (FIG. 7). As used herein, $Z_{est2}$ is the best initial focal position as determined by quadratic regression analysis. If the projections of tag points onto the Z=0 plane all exist in the line, e.g. along the same column or row, a parabola is fit to the tag points. If the projections of tag points onto the Z=0 plane are not all in the same line, a quadratic surface is fit to the tag points. FIG. 8 provides an example of both a linear regression analysis and a quadratic regression analysis to the raw focus data of a microtiter plate.

Subsequently, the success of the quadratic regression analysis is assessed 360. If the quadratic regression analysis fails, $Z_{est}$ for the current sample location is set to the value determined for $Z_{est1}$ 365. In the case of the third sample location, there are only two previous data points, and neither the weighting procedure 340 nor the quadratic regression analysis 355 are performed due to an insufficient number of data points. The weighted least-squares approximation therefore returns a failure 360, and the $Z_{est}$ for the third sample location is determined solely based on the results of the linear regression analysis 365.

If the quadratic regression analysis is successful, $Z_{est}$ for the current sample location is set to the average of the values determined for $Z_{est1}$ and for $Z_{est2}$ 370, as will be the case for the fourth and subsequent sample locations.

A determination of the validity of $Z_{est}$ obtained 380 and the value of MinDist relative to the predefined maximum is then made 225. If MinDist is greater than the predefined maximum, such that the current sample location is too far from the previous tag points to have confidence in the best initial focal position determination, the instrument is adjusted to move to $Z_{bottom}$ 240 and the focal position is determined by searching over a large range of focal planes 245 to yield $Z_{best}$. If MinDist is within the predefined limit, the stage and focus motors of the instrument are moved to the X,Y, and $Z_{est}$ coordinates of the current sample position 230, and the focal position is determined by searching over a small range of focal planes 235 to yield $Z_{best}$.

We claim:

1. A method for determining an initial focal position estimate for a current sample location on a substrate comprising multiple sample locations using a microscope focus positioning system, wherein the method comprises:

(A) determining a focal position of at least two other sample locations on the substrate, comprising conducting a focal position search over a large range of focal planes;

(B) aligning the microscope focusing position system with a current sample location on the substrate;

(C) estimating an initial focal position estimate for the current sample location on the substrate by a method comprising carrying out one or more techniques selected from the group consisting of:

i) conducting a linear regression analysis of focal positions determined in step (A) for at least two other sample locations on the substrate to estimate an initial focal position for the current sample location; and ii) conducting a quadratic regression analysis of focal positions determined in step (A) for at least three other sample locations on the substrate to estimate an initial focal position for the current sample location, and (D) focusing over a narrow range of focal planes to obtain the focal position for the current sample location on the substrate;

wherein said sample locations are selected from the group consisting of wells of a microtiter plate, cell binding locations on a chemically patterned surface, and user-defined subsections of substrates containing one or more specimen (s) spread out in space that is to be optically imaged by applying microscopy.

2. The method of claim 1 wherein the technique is linear regression analysis.

3. The method of claim 1 wherein the technique is quadratic regression analysis.

4. The method of claim 1 wherein the one or more techniques are both linear regression analysis and quadratic regression analysis, and wherein the result is an average of a result from linear regression analysis and a result from quadratic regression analysis.

5. The method of claim 2 wherein the linear regression analysis comprises fitting a line or a plane to the focal positions determined for at least two other sample locations on the substrate for which a focal position has been determined.

6. The method of claim 2 wherein the linear regression analysis comprises using the focal positions of at least three sample locations on the substrate for which a focal position has been determined which are closest to the current sample location.

7. The method of claim 3 wherein the quadratic regression analysis comprises fitting a parabola or a quadratic surface to the focal positions of the at least three other sample locations on the substrate for which a focal position has been determined.

8. The method of claim 3 wherein the quadratic regression analysis comprises using focal positions of all sample locations on the substrate for which a focal position has been determined.

9. The method of claim 3 wherein the quadratic regression analysis is performed by a weighted least squares estimate.

10. The method of claim 3 wherein the focal positions determined for other sample locations on the substrate are weighted in inverse proportion to their distance from the current sample location prior to performing the quadratic regression analysis.

11. The method of claim 1 wherein the sample locations comprise cells.

12. A machine readable storage medium comprising a program containing a set of instructions for causing a cell screening system to execute the method of claim 1.

* * * * *